(12) United States Patent
LeBeau et al.

(10) Patent No.: US 9,105,269 B2
(45) Date of Patent: *Aug. 11, 2015

(54) METHOD, APPARATUS, AND SYSTEM FOR AUTOMATICALLY MONITORING FOR VOICE INPUT BASED ON CONTEXT

(71) Applicant: Google Inc., Mountain View, CA (US)

(72) Inventors: Michael J. LeBeau, New York, NY (US); John Nicholas Jitkoff, Palo Alto, CA (US); Dave Burke, London (GB)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/560,696

(22) Filed: Dec. 4, 2014

(65) Prior Publication Data
US 2015/0112691 A1    Apr. 23, 2015

Related U.S. Application Data

(63) Continuation of application No. 13/706,696, filed on Dec. 6, 2012, now Pat. No. 8,918,121, which is a continuation of application No. 12/852,256, filed on Aug. 6, 2010, now Pat. No. 8,359,020.

(51) Int. Cl.
*H04W 4/02* (2009.01)
*G10L 17/22* (2013.01)
*H04M 1/725* (2006.01)

(52) U.S. Cl.
CPC ........... *G10L 17/22* (2013.01); *H04M 1/72522* (2013.01)

(58) Field of Classification Search
CPC ....... G10L 15/26; G10L 15/265; H04M 1/04; H04M 1/72561; H04M 1/72569; H04M 2201/40; H04M 2250/74; H04M 4/046
USPC .................. 455/436, 411, 418–422.1, 456.1, 455/404.1–404.2, 414.1, 550.1; 370/328, 370/338
See application file for complete search history.

(56) References Cited

U.S. PATENT DOCUMENTS 6,615,170 B1 * 9/2003 Liu et al. ........................ 704/233
7,200,413 B2    4/2007 Montemer et al.
7,221,960 B2    5/2007 Schlegel (Continued)

OTHER PUBLICATIONS

Office Action issued in U.S. Appl. No. 13/706,696 on Aug. 5, 2013, 18 pages.
Office Action issued in U.S. Appl. No. 13/706,696 on Dec. 5, 2013, 25 pages.
Notice of Allowance issued in U.S. Appl. No. 13/706,696 on Jun. 2, 2014, 14 pages.
Notice of Allowance issued in U.S. Appl. No. 13/706,696 on Aug. 6, 2014, 9 pages.

(Continued)

*Primary Examiner* — Babar Sarwar
(74) *Attorney, Agent, or Firm* — Fish & Richardson P.C.

(57) ABSTRACT

In one implementation, a computer-implemented method includes detecting a current context associated with a mobile computing device and determining, based on the current context, whether to switch the mobile computing device from a current mode of operation to a second mode of operation during which the mobile computing device monitors ambient sounds for voice input that indicates a request to perform an operation. The method can further include, in response to determining whether to switch to the second mode of operation, activating one or more microphones and a speech analysis subsystem associated with the mobile computing device so that the mobile computing device receives a stream of audio data. The method can also include providing output on the mobile computing device that is responsive to voice input that is detected in the stream of audio data and that indicates a request to perform an operation.

20 Claims, 9 Drawing Sheets

(56) References Cited

U.S. PATENT DOCUMENTS

| | | |
|---|---|---|
| 7,222,207 B2 | 5/2007 | Falcon |
| 7,523,226 B2 | 4/2009 | Anderson et al. |
| 8,041,025 B2 | 10/2011 | Dolph et al. |
| 8,326,328 B2 | 12/2012 | LeBeau et al. |
| 2002/0077830 A1* | 6/2002 | Suomela et al. ............ 704/275 |
| 2003/0055655 A1 | 3/2003 | Suominen |
| 2003/0236099 A1 | 12/2003 | Deisher et al. |
| 2005/0060365 A1 | 3/2005 | Robinson et al. |
| 2007/0011133 A1 | 1/2007 | Chang |
| 2008/0070640 A1 | 3/2008 | Shin |
| 2008/0077865 A1 | 3/2008 | Hiles et al. |
| 2008/0103781 A1 | 5/2008 | Wasson et al. |
| 2009/0259691 A1* | 10/2009 | Tanskanen et al. .......... 707/200 |
| 2010/0069123 A1 | 3/2010 | Araradian et al. |
| 2010/0105364 A1 | 4/2010 | Yang et al. |
| 2011/0231182 A1 | 9/2011 | Weider et al. |

OTHER PUBLICATIONS

Extended European Search Report issued in European Application No. 11815329.5 on Jun. 13, 2014, 10 pages.

Office Action in Australian Application No. 2011285702, issued May 1, 2014, 3 pages.

International Search Report and Written Opinion in International Application No. PCT/US2011/046616, mailed Dec. 9, 2011, 10 pages.

International Preliminary Report on Patentability in International Application No. PCT/US2011/046616, mailed Feb. 12, 2013, 9 pages.

Office Action in Chinese Application No. 201180047154.0, mailed Jul. 24, 2014, 28 pages (with English translation).

Office Action in Korean Application No. 10-2013-7005725, mailed Jan. 16, 2015, 11 pages (with English translation).

* cited by examiner

METHOD, APPARATUS, AND SYSTEM FOR AUTOMATICALLY MONITORING FOR VOICE INPUT BASED ON CONTEXT

CROSS-REFERENCE TO RELATED APPLICATIONS

This application is a continuation of U.S. patent application Ser. No. 13/706,696, filed Dec. 6, 2012, which is a continuation of U.S. patent application Ser. No. 12/852,256, filed Aug. 6, 2010, the contents of each are incorporated herein in their entirety.

TECHNICAL FIELD

This document generally describes methods, systems, and techniques for automatically monitoring for voice input using a mobile computing device, such as a mobile telephone.

BACKGROUND

Mobile computing devices (e.g., mobile telephones, smart telephones, personal digital assistants (PDAs), portable media players, etc.) have been configured to receive and process voice, or spoken, input when explicitly prompted to do so by a user. For example, mobile computing devices have been configured to begin monitoring for voice input in response to a user pressing and holding a button down for a threshold period of time (e.g., one second). For instance, if a user wants to submit a verbal search request to such a mobile computing device, then the user has to press and hold the button down for at least the threshold period of time before submitting the voice input, otherwise the voice input will not be received by the mobile computing device and the search request will not be processed.

SUMMARY

In the techniques described in this document, the context of a computing device, such as a mobile telephone (e.g., smart phone, or app phone) is taken into consideration in order to automatically determine when to monitor for voice input, such as a verbal search request. An automatic determination is a determination made without explicit user direction. Instead of waiting for a user to prompt the mobile computing device to begin monitoring for voice input (e.g., pressing and holding a button for a threshold amount of time), in the techniques described in this document a mobile computing device can automatically determine when to monitor for voice input based on a current context associated with the mobile computing device. A current context associated with a mobile computing device (and/or with a user of the mobile computing device) can include a context external to the device, such as that represents an environment around the device, or a context internal to the device such as historical information about the device that is stored in the device. Context external to the device can include, for example, the physical location where the mobile computing device is located (e.g., home, work, car, etc., as determined by GPS in the device or other techniques), and motion of the mobile computing device (e.g., accelerating, stationary, etc.). Context that is internal to the device can include recent activity on the mobile computing device (e.g., social network activity, emails sent/received, telephone calls made/received, etc.). The current context for a mobile computing device (and/or its user) is separate from user input itself that would direct the device to listen for spoken input.

For example, imagine that a user arrives home after work with his/her mobile computing device and that the user begins to cook dinner. Upon detecting that it is located at the user's home (context for the mobile computing device), in this example the mobile computing device automatically begins to monitor for voice input from the user. The device can determine its context, for example, via GPS readings or by determining that it is docked in a particular music dock or type of music dock. The user realizes, while he/she is cooking dinner, that he/she is unable to remember how much of a particular ingredient is supposed to be added to the dish. Instead of having to step away from preparing the meal to locate the recipe (e.g., wash hands and find the recipe in a book or in an electronic document), the user can simply ask how much of the ingredient should be added to the dish and, since the mobile computing device is already monitoring for voice input, the mobile computing device can receive and process the verbal request. For instance, the mobile computing device can locate an electronic document that contains the recipe, identify the quantity of the ingredient in question, and audibly respond to the user with the quantity information (e.g., "Your recipe calls for 1 cup of sugar"). With the techniques described in this document, the user in this example is able to get an answer to his/her question without interrupting his/her meal preparation (e.g., without having to first physically prompt the mobile computing device to receive voice input).

Furthering the example from the previous paragraph, the mobile computing device described may determine that it is located at the user's home based on a type of dock that the mobile computing device is placed in at the user's home. For instance, the mobile computing device may identify the type of dock based on physical electrical contacts on the dock and device that match each other, or via electronic communication (e.g., via BLUETOOTH or RFID) between the dock and the device. For example, a certain pin arrangement may be provided on a dock intended for home use, while a different arrangement may be provided for a dock intended and sold for in-car use.

By enabling such listening only in particular contexts that the user can define, the techniques here provide a powerful user interface while still allowing the user to control access to their information. Also, such monitoring may be provided as an opt in option that a user must actively configure their device to support before listening is enabled, so as to give the user control over the feature. In addition, the device may announce out loud to the user when it is entering the listening mode. In addition, the processing described here may be isolated between the device and any server system with which the device communicates, so that monitoring may occur on the device, and when such monitoring triggers an action that requires communication with a server system, the device may announce such a fact to the user and/or seek approval from the user. Moreover, the particular actions that may be taken by a device using the techniques discussed here can be pre-defined by the user, e.g., in a list, so that the user can include actions that the user is comfortable having performed (e.g., fetch information for the weather, movie times, airline flights, and similar actions that the user has determined not to implicate privacy concerns).

In one implementation, a computer-implemented method includes detecting a current context associated with a mobile computing device, the context being external to the mobile device and indicating a current state of the device in its surrounding environment, and determining, based on the current context, whether to switch the mobile computing device from a current mode of operation to a second mode of operation during which the mobile computing device monitors ambient sounds for voice input that indicates a request to perform an operation. The method can further include, in response to determining whether to switch to the second mode of operation, activating one or more microphones and a speech analysis subsystem associated with the mobile computing device so that the mobile computing device receives a stream of audio data. The method can also include providing output on the mobile computing device that is responsive to voice input that is detected in the stream of audio data and that indicates a request to perform an operation.

In another implementation, a system for automatically monitoring for voice input includes a mobile computing device and one or more microphones that are configured to receive ambient audio signals and to provide electronic audio data to the mobile computing device. The system can also include a context determination unit that is configured to detect a current context associated with the mobile computing device, the context being external to the mobile device and indicating a current state of the device in its surrounding environment, and a mode selection unit that is configured to determine, based on the current context determined by the context determination unit, whether to switch the mobile computing device from a current mode of operation to a second mode of operation during which the mobile computing device monitors ambient sounds for voice input that indicates a request to perform an operation. The system can further include an input subsystem of the mobile computing device that is configured to activate the one or more microphones and a speech analysis subsystem associated with the mobile computing device in response to determining whether to switch to the second mode of operation so that the mobile computing device receives a stream of audio data. The system can additionally include an output subsystem of the mobile computing device that is configured to provide output on the mobile computing device that is responsive to voice input that is detected in the stream of audio data and that indicates a request to perform an operation.

In an additional implementation, a system for automatically monitoring for voice input includes a mobile computing device and one or more microphones that are configured to receive ambient audio signals and to provide electronic audio data to the mobile computing device. The system can also include a context determination unit that is configured to detect a current context associated with the mobile computing device, the context being external to the mobile device and indicating a current state of the device in its surrounding environment, and means for determining, based on the current context, whether to switch the mobile computing device from a current mode of operation to a second mode of operation during which the mobile computing device monitors ambient sounds for voice input that indicates a request to perform an operation. The system can further include an input subsystem of the mobile computing device that is configured to activate the one or more microphones and a speech analysis subsystem associated with the mobile computing device in response to determining whether to switch to the second mode of operation so that the mobile computing device receives a stream of audio data. The system can additionally include an output subsystem of the mobile computing device that is configured to provide output on the mobile computing device that is responsive to voice input that is detected in the stream of audio data and that indicates a request to perform an operation.

The details of one or more embodiments are set forth in the accompanying drawings and the description below. Various advantages can be realized with certain implementations, such as providing users with greater convenience when providing voice input to a computing device. A user can simply provide voice input when the need strikes him/her instead of first having to go through formal steps to prompt the mobile computing device to receive voice input. Additionally, a mobile computing device can infer when the user is likely to provide voice input and monitor for voice input during those times. Given that monitoring for voice input may cause a mobile computing device to consume more power than when the device is in a stand-by mode, such a feature can help conserve the amount of energy consumed by a mobile computing device, especially when the mobile computing device is using a portable power source, such as a battery.

The details of one or more embodiments are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
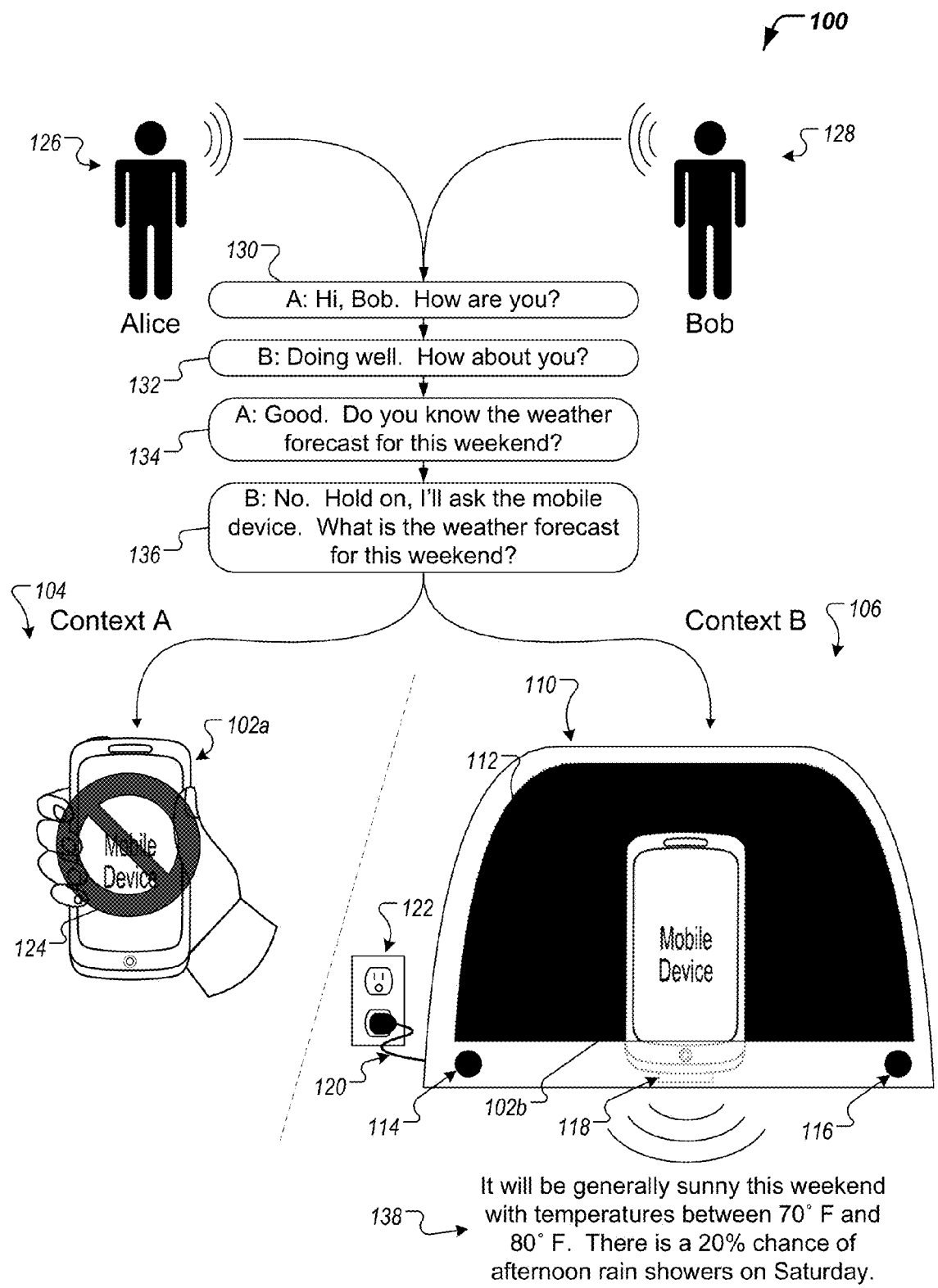
FIGS. 1A-C are conceptual diagrams of example mobile computing devices for automatically monitoring for voice input based on context.

This document describes techniques, methods, systems, and mechanisms for automatically monitoring for voice/spoken input to a mobile computing device (e.g., mobile telephone, smart telephone (e.g., IPHONE, BLACKBERRY), personal digital assistant (PDA), portable media player (e.g., IPOD), etc.). Determinations regarding when to start and stop monitoring for voice input can be based on the context associated with a mobile computing device (and/or a user of the mobile computing device). For instance, a mobile computing device may automatically monitor for voice input when the context associated with the mobile computing device (and/or a user of the mobile computing device) indicates that the user is likely to provide voice input and/or that providing voice-based features would be convenient for the user.

As mobile computing devices have become more powerful, the number of voice-related features provided by mobile computing devices have increased. For instance, a user can employ voice commands to direct a mobile computing device to initiate a telephone call (e.g., "Call Bob") and play music (e.g., "Play music by Beck"). However, mobile computing devices have been configured to monitor for such voice input only when prompted to do so by a user. For example, a user may have to press a button on the mobile computing device or activate a voice-feature on a particular application for the mobile computing device to receive and process such voice input.

The techniques, methods, systems, and mechanisms described in this document permit a user to provide voice input without having to adhere to the formalities associated with prompting a mobile computing device to use voice input. Instead, a mobile computing device can determine, without explicit user direction at the time of the determination, when to begin monitoring for voice input based on a current context associated with the mobile computing device (and/or a user of the mobile computing device). A current context for a mobile computing device can include a variety of information associated with the mobile computing device and/or a user of the mobile computing device. Such information may be external to the device and be identified by sensors in the device, such as a current physical location (e.g., home, work, car, located near wireless network "testnet2010," etc.), a direction and rate of speed at which the device is travelling (e.g., northbound at 20 miles per hour), a current geographic location (e.g., on the corner of 10th Street and Marquette Avenue), a type of dock to which a mobile computing device is docked (e.g., car-adapted dock), ambient noise (e.g., low-pitch hum, music, etc.), and current images from the mobile computing devices camera(s).

The context may be internal to the device, such as determinations made by the device about the time of day and date (e.g., 2:00 pm on Jul. 29, 2010), upcoming and/or recent calendar appointments (e.g., meeting with John at 2:30 pm on Jul. 29, 2010) recent device activity (e.g., emails sent to John regarding the 2:30 meeting), and historical images from the mobile computing devices camera(s) that do not reflect the current state around the device.

For example, a mobile computing device may determine that it is currently travelling in a car based on a detected high rate of speed at which the device is travelling (e.g., using any of a variety of motion sensors that are standard components of the device) and/or based on the device being docked in a car-adapted mobile device dock (e.g., detecting a pin arrangement for a physical electronic connection between the mobile computing device and the dock). The mobile computing device can determine whether to monitor for voice input based on this current context.

A variety of approaches can be used to determine which contexts warrant voice input monitoring and which contexts do not. For example, the mobile computing device can attempt to infer whether the current context indicates that the user has at least a threshold likelihood of providing voice input and, if so, monitoring for voice input in response. In another example, the mobile computing device can attempt to infer whether, based on the current context, monitoring for voice input would provide at least a threshold level of convenience for the user and, if so, monitoring for voice input. In another example, pre-identified and/or user-identified contexts may be used to determine when to monitor for voice input. Other techniques for determining when to monitor for voice input can also be used.

Expanding upon the car-context example above, based on the determination that the mobile computing device is located in a car, the mobile computing device can infer that it would be highly convenient (and safe) for the user to be able to provide voice input. Based on this inference regarding the determined context, the mobile computing device can begin to monitor for and process voice input from the user. The mobile computing device can continue to monitor for voice input until a variety of ending events occur, such as the current context for the mobile computing device changing (e.g., the user removes the mobile computing device from the car), the user indicating they want the voice input monitoring to end (e.g., the user providing voice input that provides such an indication, such as "stop monitoring voice input"), a battery for the mobile computing device running low on stored power (e.g., below 25% charge remaining in the battery), etc.

Monitoring for voice input can involve separating voice input from other ambient noises that may be received by the mobile computing device (e.g., background music, car horns, etc.) and then determining whether the voice input is applicable to the mobile computing device. For instance, when two users are having a conversation in the presence of a mobile computing device that is monitoring for voice input, the mobile computing device can determine which of the voice inputs are part of the users' conversation and which are requests for the mobile computing device to perform an operation. A variety of techniques can be used to make such a determination, such as monitoring for particular keywords (e.g., "search," "mobile device," etc.), examining syntax (e.g., identify questions, identify commands, etc.), etc.

As described in further detail below, a mobile computing device can monitor for and process voice input locally on the mobile computing device and/or in conjunction with a computer system that is remote to the mobile computing device. For example, a mobile computing device can determine its current context, determine whether to monitor for voice input, identify voice input that is directed at the mobile computing device, and cause a command associated with the voice input to be performed as a standalone device (e.g., without interacting with other devices over a network) and/or through interaction with a remote server system.

Figure 1B:
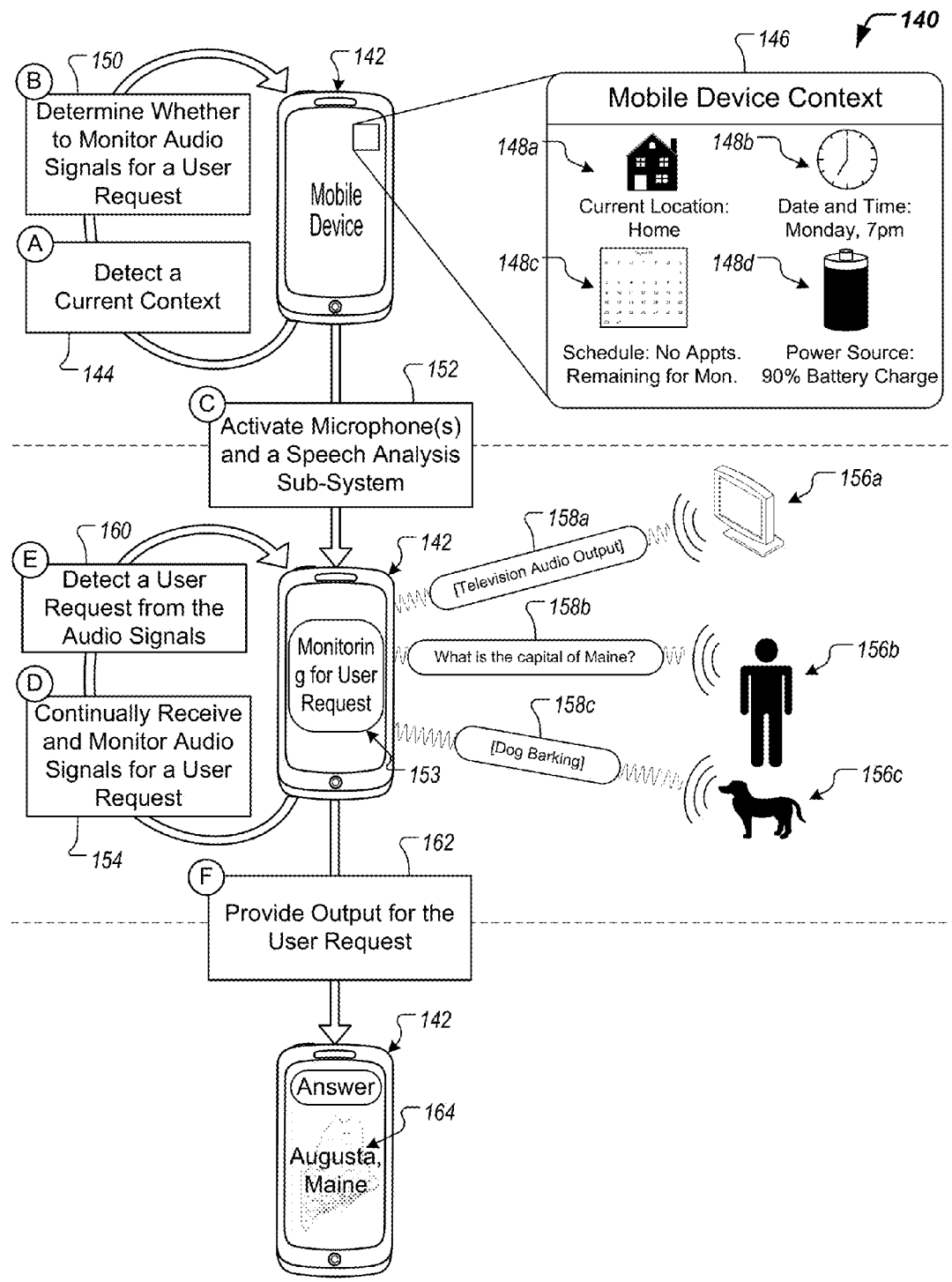
Figure 1C:
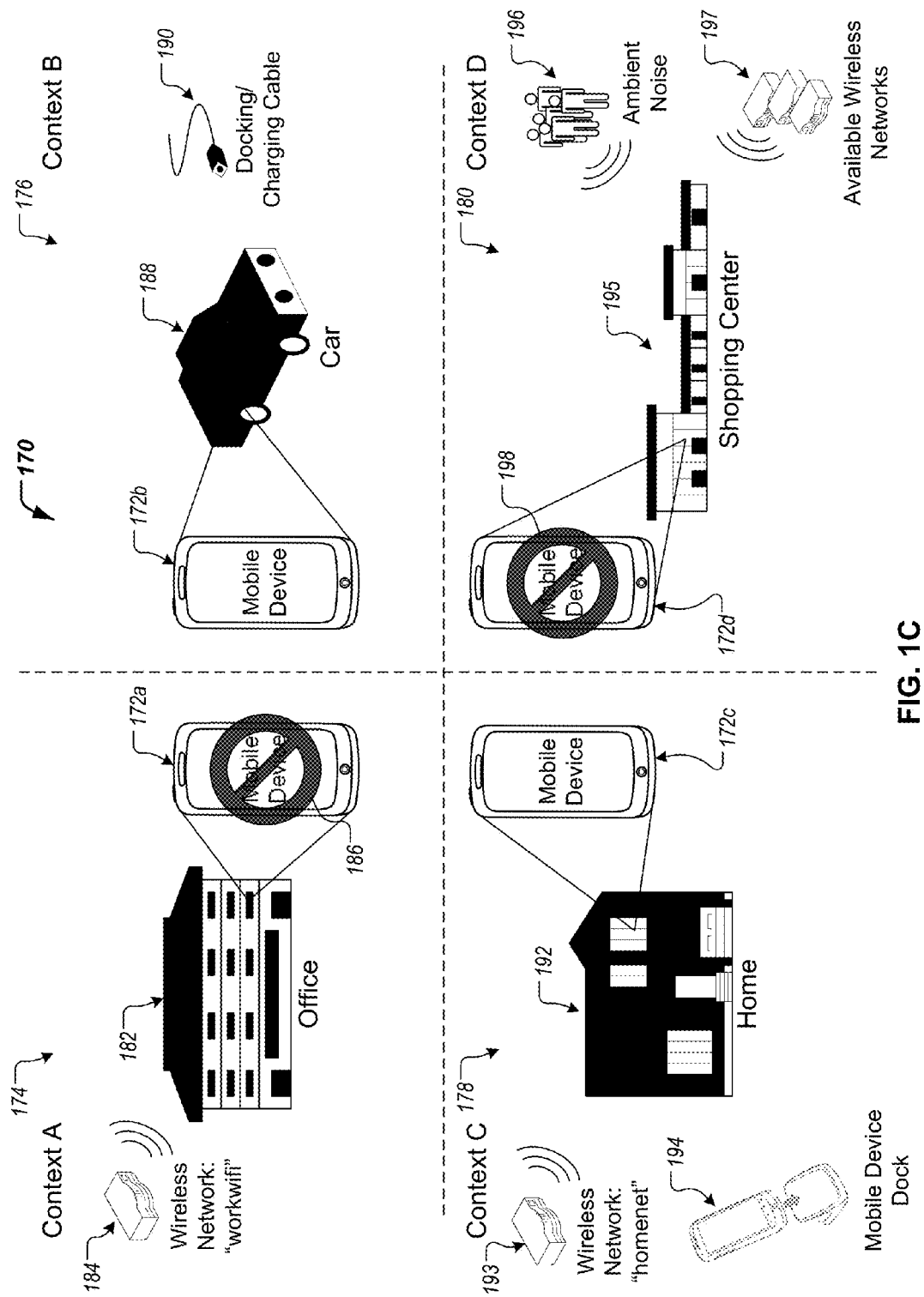

FIGS. 1A-C are conceptual diagrams 100, 140, and 160 of example mobile computing devices 102a-b, 142, and 162a-d for automatically monitoring for voice input based on context. Referring to FIG. 1A, the diagram 100 depicts an example of monitoring for voice input with the mobile computing device 102a-b (intended to refer to the same computing device) in two different contexts (context A 104 and context B 106).

In the context A 104, the mobile computing device 102a is depicted as being held in a user's hand 108 without being otherwise physically connected or tethered to other devices or cords. The mobile computing device 102a is depicted in this example as using a mobile power source (e.g., a battery) to operate.

In the context B 106, the mobile computing device 102b is depicted as being docked in a mobile device dock 110 that includes a speaker 112 and microphones 114 and 116. The mobile computing device 102b is depicted as in electronic physical contact with a mobile device interface 118 of the dock 110. The mobile computing device 102b and the dock 110 can communicate through this electronic physical connection. For instance, the mobile device 102b can stream audio data to the dock 110 through the connection with the interface 118, which can cause the dock 110 to play the music using the speakers 112. Similarly, the dock 110 can provide the mobile device 102b with audio data received through the speakers 114 and 116 through the interface 118.

Further with regard to the context B 106, the dock 110 is depicted as receiving power from a power cord 120 that is plugged into a power outlet 122. The mobile computing device 102b can receive power from an external power source (e.g., directly from the dock 110, indirectly from the power outlet 122, etc.) through the interface 118 of the dock 110.

Based on the contexts 104 and 106, the mobile computing device 102a-b determines whether to monitor for voice input autonomously (without first being prompted or instructed to do so by a user). With regard to the context A 104, the mobile computing device 102*a* determines to not monitor for voice input based on, at least, the device using a portable power source (a battery) instead of an external power source. With a portable power source, the power supply is finite. Yet, monitoring for voice input can drain more power than normal standby operation of the mobile computing device 102*a* and can go on for an indeterminate amount of time. As a result, in the context A 104 the mobile computing device 102*a* can determine that any potential convenience to the user of monitoring for voice input is outweighed by the inconvenience to the mobile computing device 102*a* of potentially draining the battery in a relatively short period of time (short when compared to standby operation). Additionally, the mobile computing device 102*a* may determine that any voice input provided by a user will not be received with sufficient clarity to accurately process based on the mobile computing device 102*a* having to rely on its own microphone (as opposed to external microphones, like the microphones 114 and 116). As a result, the mobile computing device 102*a* in the context A 104 does not monitor for voice input, as indicated by the symbol 124.

In contrast, referring to the context B 106, the mobile computing device 102*b* determines to monitor for voice input based on the mobile computing device 102*b* being connected to the dock 110 (as indicated by the absence of a symbol like the symbol 124 in the context A 104). As indicated above, the mobile computing device 102*b* may identify the dock 110 as a particular type of dock based on the arrangement of pins used in the interface 118. Through the connection with the dock 110, the mobile computing device 102*b* receives the benefit of an external power source (e.g., the dock 110, the outlet 122) and external microphones 114 and 116. In this example, the mobile computing device 102*b* can determine to monitor for voice input based on any combination of the connection to the dock 110, the type of dock to which the mobile computing device 102*b* is connected (e.g., home stereo dock), the availability of an external power source, and the availability of external microphones 114 and 116. As part of monitoring for voice input, the mobile computing device 102*b* can receive a stream of audio data from the microphones 114 and 116 from which to identify (and process) voice input. Also, by limiting the monitoring to specific context B, the system can help ensure that the user is aware of monitoring by the system when it is occurring.

The device 102*b* may also announce when it switches into a monitoring mode. For example, when the device has been docked, the speakers on the dock may announce "Device is now monitoring for requests—please say stop monitoring to disable feature." Such announcements may provide additional notice to a user that monitoring is occurring, so that the user can obtain the advantages of monitoring, while maintaining control over what is monitored.

The depicted conversation between Alice 126 and Bob 128 demonstrates the voice input monitoring performed by the mobile computing device 102*a*-*b*. Alice says to Bob "Hi, Bob. How are you?" (130) and Bob responds, "Doing well. How about you?" (132). Alice replies "Good. Do you know the weather forecast for this weekend?" (134) and Bob says, "No. Hold on. I'll ask the mobile device. What is the weather forecast for this weekend?" (136).

As demonstrated by the symbol 124, the conversation 130-136 between Alice 126 and Bob 128 is not received by the mobile computing device 102*a* in the context A 104 based on the determination to not monitor for voice input.

In contrast, the conversation 130-136 between Alice 126 and Bob 128 is received as part of the steam of audio data received by the mobile computing device 102*b* using the interface 118 and the microphones 114 and 116 of the dock 110. The mobile computing device 102*b* can use a speech analysis subsystem to detect the voice input 130-136 from other ambient noises, such as background music, and to identify if any of the voice input 130-136 is a request for the mobile computing device 102*b*.

As described earlier, the mobile computing device 102*b* can use a variety of techniques to identify whether any of the voice input 130-136 is a request for the mobile computing device 102*b*. For example, the mobile computing device 102*b* can scan the voice input 130-136 for keywords, like the term "search" used in the command "search for nearby restaurants" and the term "mobile device" used in the question "mobile device, what is the current score of the baseball game?" In another example, the mobile computing device 102*b* can monitor the syntax of the voice input 130-136 to try to identify parts of speech that may be directed to the mobile computing device 102*b*, such as questions and commands. In a further example, the mobile computing device 102*b* can be tipped off that certain voice input is/was directed to the mobile computing device 102*b* based on changes in the voice input structure, such as pauses (e.g., user waiting for a response from the mobile computing device 102*b*), changes in an apparent direction of the audio signal (e.g., user faces the mobile computing device 102*b* when providing command), changes in speed of delivery (e.g., user slows down speech when directed to mobile computing device 102*b*), changes in tone and inflection (e.g., user lowers tone and decreases level of inflection when addressing the mobile computing device 102*b*), etc. Other techniques, as well as combinations of techniques, can also be used.

In this example, there are a number of questions in the conversation 130-136 between Alice 126 and Bob 128, but only the question in voice input 136 is directed at the mobile computing device 102*b*. Using any combination of the techniques described in the previous paragraph, the mobile computing device 102*b* is able to correctly isolate this voice input 136 as being a request for the mobile computing device 102*b* to perform an operation. For instance, the mobile computing device 102*b* can identify the phrase "mobile device" in the voice input 136 from Bob and then analyze the syntax of the voice input 136 to isolate the question "What is the weather forecast for this weekend?" as being directed to the mobile computing device 102*b*.

In response to making such an identification, the mobile computing device 102*b* can initiate a search to determine the weather forecast for the current geographic location of the mobile computing device 102*b* for the upcoming weekend. The mobile computing device 102*b* can identify this information locally (e.g., querying weather application on the mobile computing device 102*b* that periodically obtains and stores the weather forecast) and/or through interaction with a remote information server system over a network (e.g., the Internet, cellular network, 3G/4G network, etc.).

The mobile computing device 102*b* can provide the requested weather information to Alice 126 and Bob 128 using any of a variety of available output devices, such as a display (e.g., display on the mobile computing device 102*b*, a computer monitor, a television, etc.), a speaker system (e.g., internal speakers on the mobile computing device 102*b*, the speakers 112 of the dock 110, etc.), a projector (e.g., a projector that is part of the mobile computing device 102*b* and/or the dock 110), etc. In this example, the mobile computing device 102*b* audibly outputs the weather information using a text-to-speech (TTS) subsystem of the mobile computing device 118 and the speaker 112 of the dock 110 (138).

Referring to FIG. 1B, the diagram 140 depicts an example of a mobile computing device 142 determining whether to monitor for voice input, identifying a user request from voice input, and providing output responsive to the user request.

At step A, the mobile computing device 142 detects a current context for the mobile computing device 142 and a user (not depicted) associated with the mobile computing device (144). As depicted in the example current context 146, the mobile computing device 142 is current located at the user's home (148a), the current date and time is Monday at 7:00 pm (148b), there are no appointments scheduled for the user for the balance of Monday (148c), and the mobile computing device 142 is currently using a battery with a 90% charge as its power source (148d). The current location of the mobile computing device 142 can be determined in a variety of ways, such as using geographic location information (e.g., geographic positioning system (GPS) information), identifying surrounding computing devices and/or wireless networks (e.g., detecting the presence of a wireless network for the user's home), the mobile computing device 142 being placed in a particular type of dock (e.g., the dock 110), etc.

At step B, the mobile computing device 142 determines whether to monitor audio signals for a user request based on the current context 146 of the device 142 and its user (150). As described above with regard to FIG. 1A, a variety of techniques can be used to determine whether to monitor for voice input from a user. In this example, the mobile computing device 142 determines to proceed with monitoring ambient audio signals for a user request based on an inferred likelihood that the user will provide a user request and convenience to both the user and the mobile computing device 142, as indicated by the context 146. A likelihood of providing a user request can be inferred from, at least, the time (7 pm) and the user's schedule. Although it is evening, the user is likely to have not gone to bed yet (it is only 7 pm) and the user does not have any appointments for the remainder of the evening—the user's anticipated free time over the next several hours can indicate at least a threshold likelihood of providing a voice-based request to the mobile computing device 142. Monitoring for voice input can be convenient for the user based on, at least, the mobile computing device 142 being located at the user's home where the user may be more than an arm's length away from the mobile computing device 142 (e.g., the user may be moving around the house such that it may be more convenient for a user to simply speak his/her requests instead of having to locate the mobile computing device 142 to manually prompt the computing device 142 for each request). Additionally, monitoring the voice input can be convenient for the mobile computing device based on, at least, the battery having at least a threshold charge and based on a projection that monitoring will only last for a limited period of time (e.g., the mobile computing device 142 can forecast that the user will likely go to bed within a few hours).

In response to determining to monitor audio signals, at step C the mobile computing device can activate microphone(s) and a speech analysis subsystem that are available to the mobile computing device (152). The microphones and/or the speech analysis subsystem can be local to and/or remote from the mobile computing device 142. For example, the microphones used by the mobile computing device 142 can be embedded in the mobile computing device and/or remote from the mobile computing device (e.g., the microphones 114 and 116 of the dock 110). In another example, in implementations where the speech analysis subsystem is remote, the mobile computing device 142 can provide received audio signals to the remote speech analysis subsystem and, in response, receive information indicating whether any voice input has been detected.

The mobile computing device 142 can display a message 153 to the user indicating that audio signal monitoring for a user request is going on. This can provide the user with the opportunity to cancel the operation if the user does not desire it to take place.

At step D, the mobile computing device 142 continually receives and monitors ambient audio signals for a user request (154). For example, a television 156a, a person 156b, and a pet 156c can produce audio signals 158a-c, respectively, that are received and examined by the mobile computing device 142.

In the midst of all of these audio signals, the user 156b directs the question "What is the capital of Maine?" (158b) to the mobile computing device 142 as a user request. The mobile computing device 142 (possibly in conjunction with a remote speech analysis subsystem) can detect this user request from the audio signals 158a-c using any of a variety of techniques, as described above with regard to FIG. 1A. The mobile computing device 142 can then process the user request either locally (e.g., search a locally stored information database) or by interacting with a remote information server system.

Having obtained a response to the identified user request, the mobile computing device can provide output for the user request, as indicated by step F (162). In the present example, the mobile computing device displays the answer 164 to the user's question on the display of the mobile computing device 142. As described above with regard to FIG. 1A, other ways to provide such output are also possible with the mobile computing device 142.

Referring to FIG. 1C, the diagram 170 depicts an example of monitoring for voice input using a mobile computing device 172a-d (intended to be a single mobile computing device depicted in a variety of different contexts) in four different contexts (context A 174, context B 176, context C 178, and context D 180).

Referring to the context A 174, the mobile computing device 172a is depicted as being located at a user's office 182. In this example, the mobile computing device 172a is able to identify its current location based on the presence of the wireless network "workwifi" 184 that is associated with the office 182. As indicated by the symbol 186, the mobile computing device 172a determines to not monitor for voice input at the user's office 182 based on the context A 174. This determination can be based on any of a variety of factors discussed above with regard to FIGS. 1A-B.

Referring to the context B 176, the mobile computing device 172b is depicted as being located in the user's car 188. In this example, the mobile computing device 172b can determine its current context based on, at least, a connection with a car-adapted docking/charging cable 190. As indicated by the absence of a symbol like the symbol 186, the mobile computing device 172b determines to monitor for user requests made while inside the user's car 188 based on the context B 176. This determination can be based on any of a variety of factors discussed above with regard to FIGS. 1A-B.

Context C 178 depicts the mobile computing device 172c as being located in the user's home 192. The mobile computing device 172c is able to determine its current context based on, at least, the presence of wireless network "homenet" 193 that is associated with the user's home 192 and the device 172c being placed in mobile device dock 194. As indicated previously, the mobile device 172 can distinguish between a connection to the car adapted docking/charging cable 190 and the mobile device dock 194 based on a variety of factors, such as differing pin arrangements. As indicated by the absence of a symbol like the symbol 186, the mobile computing device 172c determines to monitor for user requests made while inside the user's car 192 based on the context C 178. This determination can be based on any of a variety of factors discussed above with regard to FIGS. 1A-B.

Context D 180 shows the mobile computing device 172d being located at a shopping center 195. The mobile computing device 172d determines its current context based on, at least, a relatively high level of ambient noise 196 (e.g., other shoppers talking in the shopping center 195, background music piped into the shopping center 195, etc.) and a multitude of available wireless networks 197. Based on the ambient noise 196 and the wireless networks 197, the mobile device 172d can generally infer that it is located in a public area. Based on the context D 180, the mobile computing device can determine to not monitor for voice input, as indicated by the symbol 198.

The mobile computing device 172 can toggle between monitoring for voice input and not monitoring for user requests as the context for the mobile computing device 172 changes. For instance, when the user leaves the office 182 with the mobile computing device 172 and gets into the car 188, the mobile computing device 172 can switch from not monitoring for user requests (in the office 182) to monitoring for user requests (in the car 188).

Contexts within which the mobile computing device 172 monitors for user requests can differ among devices and/or associated users, and they can change over time. A feedback loop can be used to continually refine the contexts within which the mobile computing device 172 monitors for voice input. For instance, if a user does not provide many voice-based requests to the computing device 172 in the context C 178 over time, the mobile computing device 172 may stop monitoring for voice input in the context C 178. Conversely, if the user manually prompts the computing device 172 to receive voice input in the context A 174 with a fair amount of frequency, the mobile computing device 172 may begin to monitor for voice input in the context A 174.

Figure 2A:
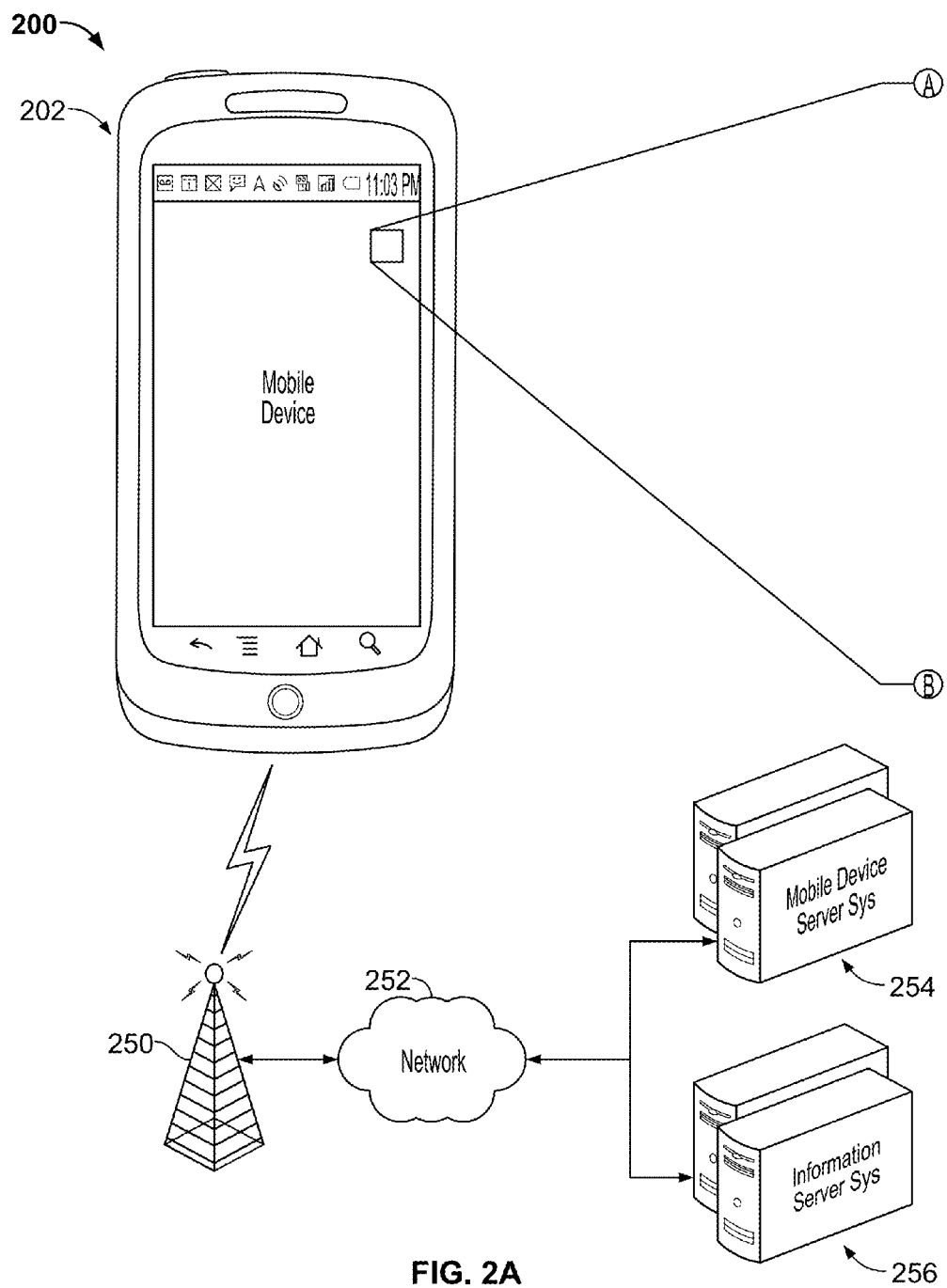
FIGS. 2A-B are diagrams of an example system for automatically monitoring for voice input based on a current context associated with a mobile computing device.
Figure 2B:
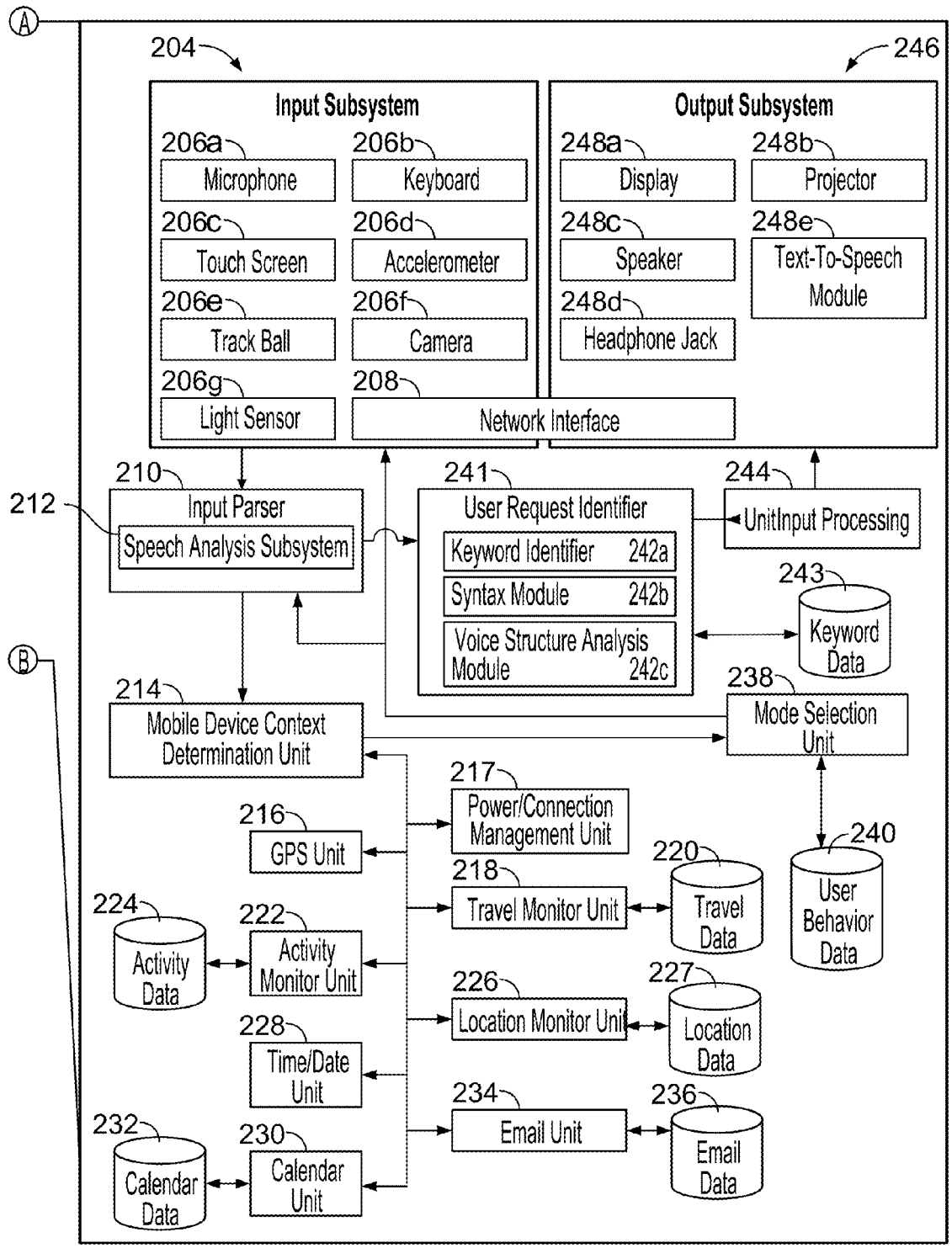

FIGS. 2A-B are diagrams of an example system 200 for automatically monitoring for voice input based on a current context associated with a mobile computing device 202. In this example, the mobile computing device 202 is configured to automatically determine when to start and when to stop monitoring for voice input based on a current context associated with the mobile computing device and/or a user of the mobile computing device, similar to the mobile computing devices 102, 142, and 172 described above with regard to FIGS. 1A-C.

The mobile computing device 202 is depicted as including an input subsystem 204 through which a voice input (as well as other types of input) can be received by the mobile computing device 202. Referring to FIG. 2B, the input subsystem 204 is depicted as including a microphone 206a (configured to receive audio-based input), a keyboard 206b (configured to receive key-based input), a touchscreen 206c (configured to receive screen touch-based input), an accelerometer 206d (configured to receive motion-based input), a trackball 206e (configured to receive GUI pointer-based input), a camera 206f (configured to receive visual input), and a light sensor 206g (configured to receive input based on light intensity). The input subsystem 204 also includes a network interface 208 (e.g., wireless network interface, universal serial bus (USB) interface, BLUETOOTH interface, public switched telephone network (PSTN) interface, Ethernet interface, cellular network interface, 3G and/or 4G network interface, etc.) that is configured to receive network-based input and output. Other types of input devices not mentioned may also be part of the input subsystem 204.

An input parser 210 of the mobile computing device 202 can be configured to receive input from the input subsystem 204, such as electronic audio data, and to determine whether the received audio data includes voice input. The input parser 210 can include a speech analysis subsystem 212. The speech analysis subsystem 212 can analyze and determine whether any voice input is present in audio data received by the microphone 206a while monitoring for a user request. The input parser 210 can include other modules not depicted for interpreting user input received through the input subsystem 204, such as a computer vision module to interpret images obtained through the camera 206f and a gesture module to interpret physical movement data provided by the accelerometer 206d.

A mobile device context determination unit 214 can determine a current context for the mobile computing device 202. The mobile device context determination unit 214 can determine a current context for the mobile device 202 using input received by the input subsystem 204 and interpreted by the input parser 210, as well as a variety of context monitoring units of the mobile computing device 202.

For instance, a global positioning system (GPS) unit 216 can provide geographic location information to the mobile device context determination unit 214 and a power/connection management unit 217 can provide information regarding a current power source and/or power state for the mobile computing device (e.g., connected to external power source, battery at 80% charge, etc.) as well as information regarding charging and/or communication connections for the mobile computing device 202 (e.g., device is docked, device is connected to a wireless network, etc.). A travel monitor unit 218 (in conjunction with a travel data repository 220) can provide information related to a route currently being travelled and habitual routes travelled by the mobile computing device 202. An activity monitor unit 222 (in conjunction with an activity data repository 224) can provide information related to recent and habitual user activity (e.g., applications used, specific information accessed at various times, etc.) on the mobile device 202. A location monitor unit 226 can provide information regarding a current physical location (e.g., home, work, in a car, etc.) for the mobile computing device 202. The location monitor unit 226 can use a location data repository 227 to determine the current physical location. The location data repository 227 can associate information regarding the mobile computing device 202's detected surroundings (e.g., available wireless networks, ambient sounds, nearby computing devices, etc.) with physical locations. The location monitor unit 226 can also identify entities (e.g., businesses, parks, festivals, public transportation, etc.) that are physically located near the mobile device 202.

A time and date unit 228 can provide current time and date information and a calendar unit 230 (in conjunction with a calendar data repository 232) can provide information related to appointments for the user. An email unit 234 (in conjunction with an email data repository 236) can provide email-related information (e.g., recent emails sent/received). The mobile context determination unit 214 can receive information from other context monitoring units not mentioned or depicted.

In some implementations, the context monitoring units 216-236 can be implemented in-part, or in-whole, remote from the mobile computing device 202. For example, the email unit 234 may be a thin-client that merely displays email-related data that is maintained and provided by a remote server system. In such an example, the email unit 234 can interact with the remote server system to obtain email-related information to provide to the mobile device context determination unit 214.

A mode selection unit 238 can use the current context for the mobile device 202, as determined by the mobile device context determination unit 214, to determine whether to start or to stop monitoring audio data for voice input indicating a user request for the mobile computing device 202. The mode selection unit 238 can determine whether to select from among, at least, an audio monitoring mode during which audio data is monitored for a user request and no monitoring mode during which the mobile computing device 202 does not monitor audio data. Determining whether to switch between modes (whether to start or to stop audio monitoring) can be based on any of a variety of considerations and inferences taken from the current context of the mobile device 202 (and/or a user associated with the mobile device 202), as described above with regard to FIGS. 1A-C.

In addition to using the current context, the mode selection unit 238 can determine whether to start or stop monitoring audio data for a user request based on user behavior data associated with audio data monitoring that is stored in a user behavior data repository 242. The user behavior data repository 242 can log previous mode selections, a context for the mobile device 202 at the time mode selections were made, and the user's subsequent behavior (e.g., user did or did not provide requests through voice input during the audio monitoring mode, user manually switched to different mode of operation, user manually prompted device to receive and process voice input when in the no monitoring mode, etc.) with respect to the selected mode. The user behavior data stored in the user behavior data repository 242 can indicate whether the mode selected based on the context of the device 202 was correctly inferred to be useful and/or convenient to the user. Examples of using user behavior data to select a mode of operation are described above with regard to FIG. 1C.

The mode selection unit 238 can notify, at least, the input subsystem 204 and the input parser 210 regarding mode selections. For instance, in response to being notified that the mobile computing device 202 is switching to an audio monitoring mode, the input subsystem 204 can activate the microphone 206a to begin receiving audio data and the input parser 210 can activate the speech analysis subsystem to process the audio data provided by the microphone 206a. In another example, in response to being notified that the mobile computing device 202 is switching to a no monitoring mode of operation, the input subsystem 204 can deactivate the microphone 206a and the input parser 210 can deactivate the speech analysis subsystem.

When at least the microphone 206a and the speech analysis subsystem 212 are activated during an audio monitoring mode of operation and the speech analysis subsystem 212 detects voice input from a stream of audio data provided by the microphone 206a and the input subsystem 204, a user request identifier 241 can be notified of the identification. The user request identifier 241 can determine whether the detected voice input indicates a request from the user for the mobile computing device to perform an operation (e.g., search for information, play a media file, provide driving directions, etc.). The user request identifier 241 can use various subsystems to aid in determining whether a particular voice input indicates a user request, such as a keyword identifier 242a, a syntax module 242b, and a voice structure analysis module 242c.

The keyword identifier 242a can determine whether a particular voice input is directed at the mobile computing device 202 based on the presence of keywords from a predetermined group of keywords stored in a keyword repository 243 in the particular voice input. For example, a name that the user uses to refer to the mobile computing device 202 (e.g., "mobile device") can be a keyword in the keyword repository 243. In another example, commands that may be frequently processed by the mobile computing device 202, such as "search" (as in "search for local news") and "play" (as in "play song by Beatles"), can be included in the keyword repository 243. Keywords in the keyword repository 243 can be predefined and/or user defined, and they can change overtime. For example, a feedback loop can be used to determine whether a keyword-based identification of a user request was correct or not (e.g., did the user intend for the voice input to be identified as a user request?). Such a feedback loop can use inferences drawn from subsequent user actions to determine whether a keyword should be added to or removed from the keyword repository 243. For instance, if a user frequently has quizzical responses to search results provided in response to identification of the term "search" in the user's speech, such as "huh?" and "what was that?," then the term "search" may be removed from the keyword repository 243.

Similar to the discussion of using syntax and voice input structure provided above with regard to FIG. 1A, the syntax module 242b can analyze the syntax of the voice input and the voice structure analysis module 242c can analyze the voice input structure to determine whether the voice input is likely directed to the mobile computing device 202. Similar to the keyword identifier 242a, the syntax module 242b and/or the voice structure analysis module 242c can use feedback loops to refine identification of voice input as user requests over time.

Using identified user requests from the user request identifier 241, an input processing unit 244 can process the user requests. In some implementations, the input processing unit 244 can forward the user requests to an application and/or service that is associated with the user input (e.g., provide a user request to play music to a music player application). In some implementations, the input processing unit 244 can cause one or more operations associated with the user request to be performed. For instance, the input processing unit 244 may communicate with a remote server system that is configured to perform at least a portion of the operations associated with the user input.

As described above with regard to FIGS. 1A-C, operations associated with context determination, mode selection, voice input identification, user request identification, and/or user request processing can be performed locally on and/or remote from the mobile computing device 202. For instance, in implementations where a calendar application is implemented locally on the mobile computing device 202, user requests for calendar information can be performed locally on the mobile computing device 202 (e.g., querying the calendar unit 230 for relevant calendar information stored in the calendar data repository 232). In another example, in implementations where a calendar data for a calendar application is provided on a remote server system, the mobile computing device 202 can interact with the remote server system to access the relevant calendar information.

An output subsystem 246 of the mobile computing device 202 can provide output obtained by the input processing unit 244 to a user of the device 202. The output subsystem 246 can include a variety of output devices, such as a display 248a (e.g., a liquid crystal display (LCD), a touchscreen), a projector 248a (e.g., an image projector capable of projecting an image external to the device 202), a speaker 248c, a headphone jack 248d, etc. The network interface 208 can also be part of the output subsystem 246 and may be configured to provide the results obtained by the result identification unit 244 (e.g., transmit results to BLUETOOTH headset). The output subsystem 246 can also include a text-to-speech (TTS) module 248e that is configured to convert text to audio data that can be output by the speaker 248c. For instance, the TTS module 248e can convert text-based output generated by the input processing unit 244 processing a user request into audio output that can be played to a user of the mobile computing device 202.

Referring to FIG. 2A, the mobile computing device 202 can wirelessly communicate with wireless transmitter 250 (e.g., a cellular network transceiver, a wireless network router, etc.) and obtain access to a network 252 (e.g., the Internet, PSTN, a cellular network, a local area network (LAN), a virtual private network (VPN), etc.). Through the network 252, the mobile computing device 202 can be in communication with a mobile device server system 254 (one or more networked server computers), which can be configured to provide mobile device related services and data to the mobile device 202 (e.g., provide calendar data, email data, connect telephone calls to other telephones, etc.).

The mobile device 202 can also be in communication with one or more information server systems 256 over the network 252. Information server systems 256 can be server systems that provide information that may be relevant to processing user requests. For instance, the information server systems 256 can provide current traffic conditions, up-to-date driving directions, a weather forecast, and information regarding businesses located near the current geographic location for the mobile device 202.

Figure 3A:
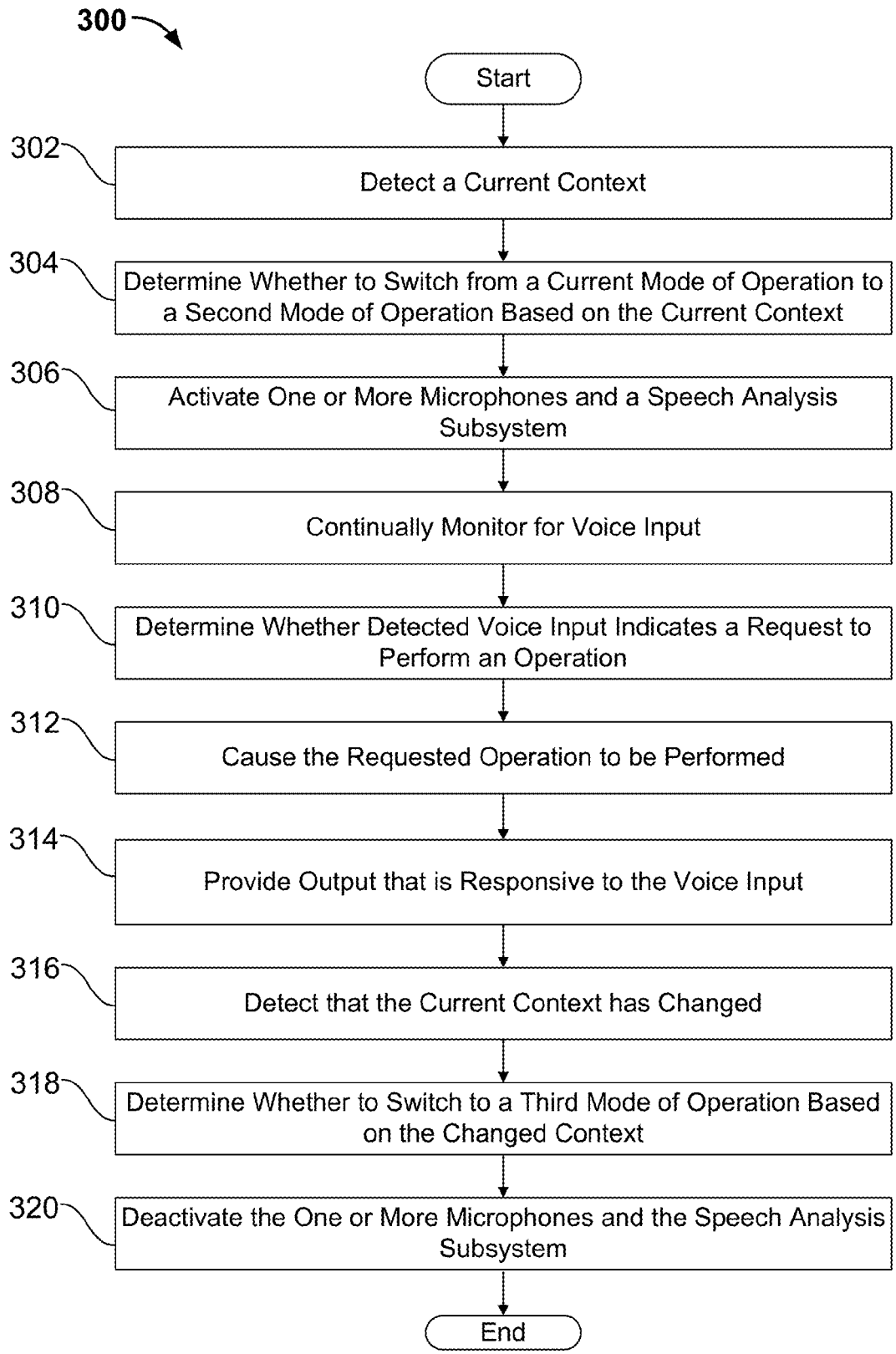
FIGS. 3A-C are flowcharts of example techniques for automatically monitoring for voice input based on a context of a mobile computing device.
Figure 3B:
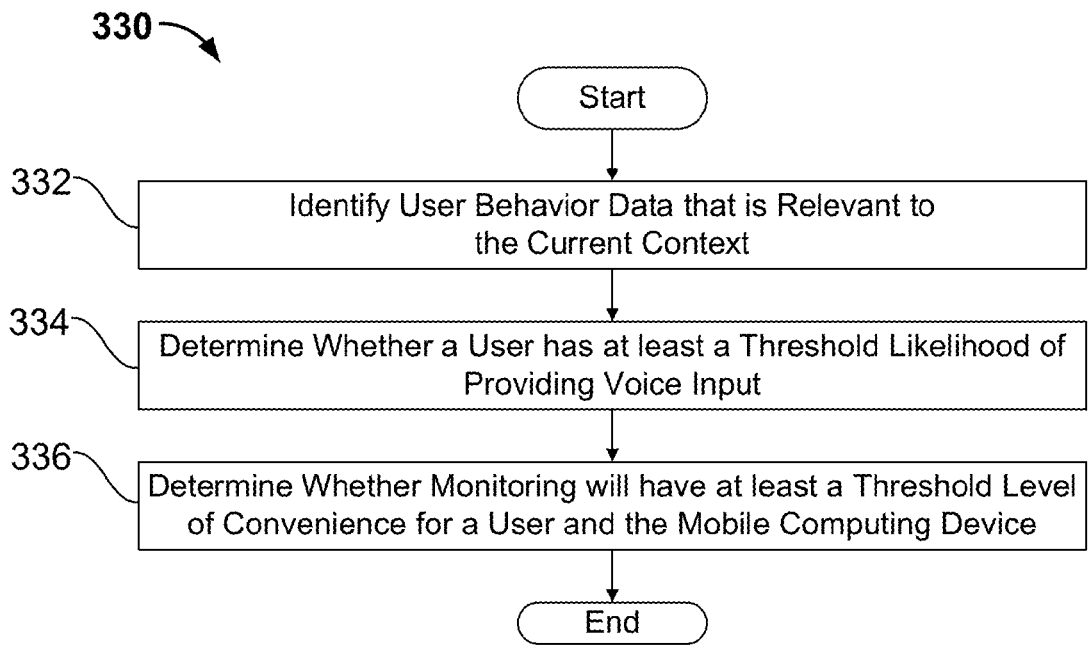
Figure 3C:
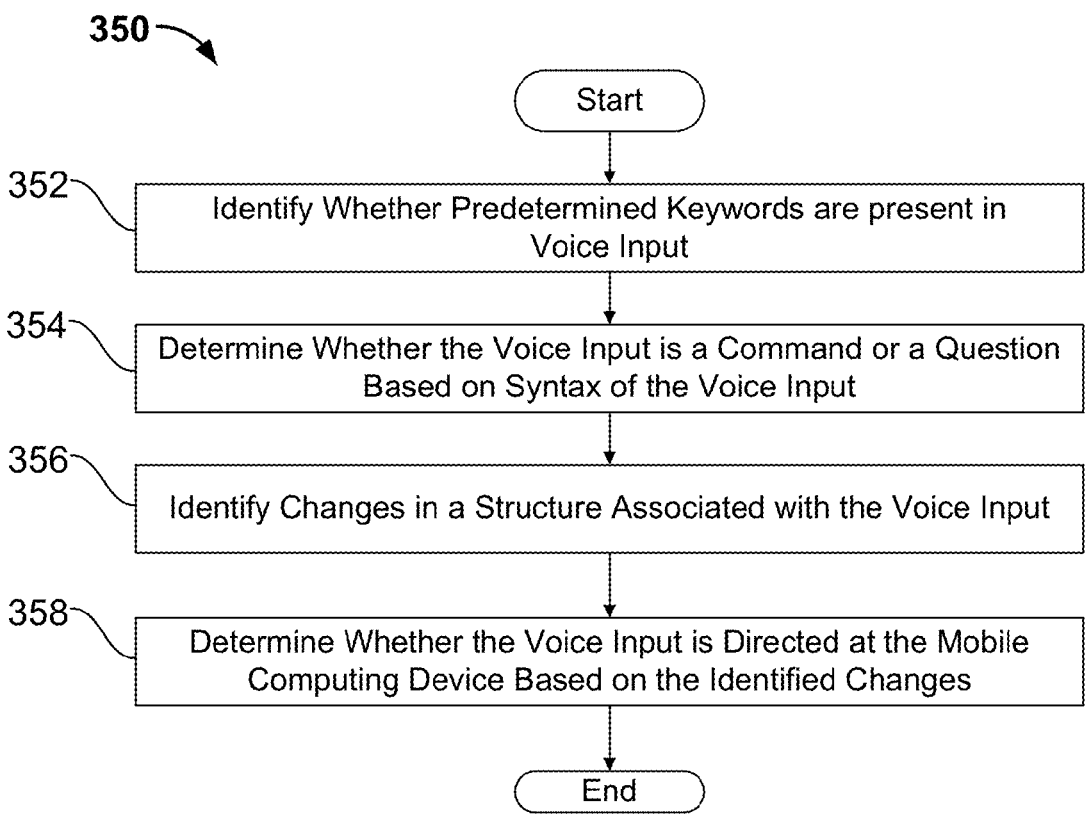

FIGS. 3A-C are flowcharts of example techniques 300, 330, and 350 for automatically monitoring for voice input based on a context of a mobile computing device. The example techniques 300, 330, and 350 can be performed by any of a variety of mobile computing devices, such as the mobile computing devices 102, 142, and 172 described above with regard to FIGS. 1A-C and/or the mobile computing device 202 described above with regard to FIGS. 2A-B.

Referring to FIG. 3A, the example technique 300 is generally directed to automatically monitoring for voice input based on a context of a mobile computing device. The technique 300 starts at step 302 by detecting a current context associated with a mobile computing device (and/or a user associated with the mobile computing device). For example, the mobile device context determination unit 214 can detect a current context associated with the mobile computing device 202 and/or a user of the mobile computing device 202 based on a variety of context-related information sources, such as the input subsystem 204 and context monitoring units 216-236, as described with regard to FIG. 2B.

A determination of whether to switch from a current mode of operation to a second mode of operation based on the current context can be made (304). For instance, the mode selection unit 238 of the mobile computing device 202 can determine whether to begin monitoring for voice input (switch from a current mode of operation to a second mode of operation) based on the current context determined by the mobile device context determination unit 214.

One or more microphones and/or a speech analysis subsystem can be activated in response to the determination of whether to switch to the second mode of operation (306). For example, in response to determining to begin monitoring for voice input, the mode selection unit 238 can instruct the input subsystem 204 and the input parser 210 to activate the microphone 206a and the speech analysis subsystem 212.

Continuous monitoring of a stream of audio data provided from the activated microphone can be monitored for voice input (308). For example, the speech analysis subsystem 212 can monitor the stream of audio data provided by the activated microphone 206a to detect voice input from other sounds and noises included in the stream.

A determination as to whether voice input that was detected during the continuous monitoring indicates a request to perform an operation can be made based (310). For example, the user request identifier 241 can examine voice input identified by the speech analysis subsystem 212 to determine whether the voice input indicates a user request for the mobile computing device 202 to perform an operation.

In response to determining that a user request is indicated by the detected voice input, the requested operation indicated by the user request can be caused to be performed (312). For instance, the user request identifier 241 can instruct the input processing unit 241 to perform the operation indicated by the user request. In some implementations, the input processing unit 241 can perform the operation locally on the mobile computing device 202 (e.g., access local data, service, and/or applications to perform the operation). In some implementations, the input processing unit 241 can interact with the mobile device server system 254 and/or the information server system 256 to perform the requested operation.

Output that is responsive to the user request indicated by the detected voice input can be provided (314). For example, the output subsystem 246 can provide output based on performance of the requested operation using one or more of the components 248a-e of the subsystem 246.

A change to the current context of the mobile computing device (and/or a user of the mobile computing device) can be detected (316). For instance, an event generated by the input subsystem 204 and/or the context monitoring units 216-234 can cause the mobile device context determination unit 214 to evaluate whether the context for the mobile computing and/or a user of the mobile computing device has changed.

In response to detecting a (at least threshold) change in the context, a determination as to whether to switch to a third mode of operation can be made based on the changed context (318). For example, the mode selection unit 238 can examine the changed context of the mobile computing device 202 to determine whether to stop monitoring for voice input (switch to the third mode of operation).

Based on a determination to switch to the third mode of operation, the one or more microphones and/or the speech analysis subsystem can be deactivated (320). For instance, upon determining to stop monitoring for voice input (switch to the third mode of operation), the mode selection unit 238 can instruct the input subsystem 204 and the input parser 210 to deactivate the microphone 206a and the speech analysis subsystem 212, respectively.

Referring to FIG. 3B, the example technique 330 is generally directed to determining whether to start monitoring for voice input (switch from a current mode of operation to a second mode of operation) based on a current context for a mobile computing device. The example technique 330 can be performed as part of the technique 300 described above with regard to FIG. 3A. For example, the technique 330 can be performed at step 304 of the technique 300.

The technique 330 can begin at step 332 by identifying user behavior data that is relevant to the current context. For example, based on the current context of the mobile computing device 202, as determined by the context determination unit 214, the mode selection unit 238 can access user behavior data from the user behavior data repository 240 that is associated with a context similar to the current context.

A determination as to whether a user has at least a threshold likelihood of providing voice input can be made based on a variety of factors, such as user behavior data identified as relevant to the current context (334). For example, the mode selection unit 238 can determine whether a user will be likely to provide voice input if the mobile computing device 202 begins monitoring for voice input based on a variety of factors, such as previous user actions in response to voice monitoring previously performed in similar contexts (user behavior data). If there is at least a threshold likely of voice input being provided by the user, then the mode selection unit 238 can begin monitoring for voice input.

A determination as to whether monitoring for voice input will have at least a threshold level of convenience for the user and/or the mobile computing device can be made (336). For example, the mode selection unit 238 can examine whether monitoring for voice input will be convenient for a user of the mobile computing device 202 and/or whether monitoring for voice input will be convenient for the mobile computing device 202 (e.g., examine whether the mobile computing device 202 has a sufficient power supply to continuously monitor for voice input), similar to the description above with regard to step B 150 depicted in FIG. 1B.

Referring to FIG. 3C, the example technique 350 is generally directed to determining whether a voice input detected while monitoring audio data is a user request to perform an operation. The example technique 350 can be performed as part of the technique 300 described above with regard to FIG. 3A. For example, the technique 350 can be performed at step 310 of the technique 300.

The technique 350 can start at step 352 by identifying whether one or more keywords from a predetermined group of keywords are present in detected voice input. For example, the keyword identifier 242a of the user request identifier 241 can examine whether one or more of the keywords stored in the keyword data repository 243 are present in voice input detected by the speech analysis subsystem 212 while continuously monitoring for voice input.

A determination as to whether the voice input is a command or a question based on syntax of the voice input can be made (354). For example, the syntax module 242b can determine whether the syntax of voice input detected by the speech analysis subsystem 212 indicates a command or question that is directed at the mobile computing device 202 by a user.

Changes in a structure associated with the voice input can be identified (356) and, based on the identified changes, a determination as to whether the voice input is directed at the mobile computing device can be made (358). For example, the voice structure analysis module 242c of the user request identifier 241 can determine whether a structure of the voice input detected by the speech analysis subsystem 212 has changed in a manner that indicates the voice input is directed at the mobile computing device 202.

Figure 4:
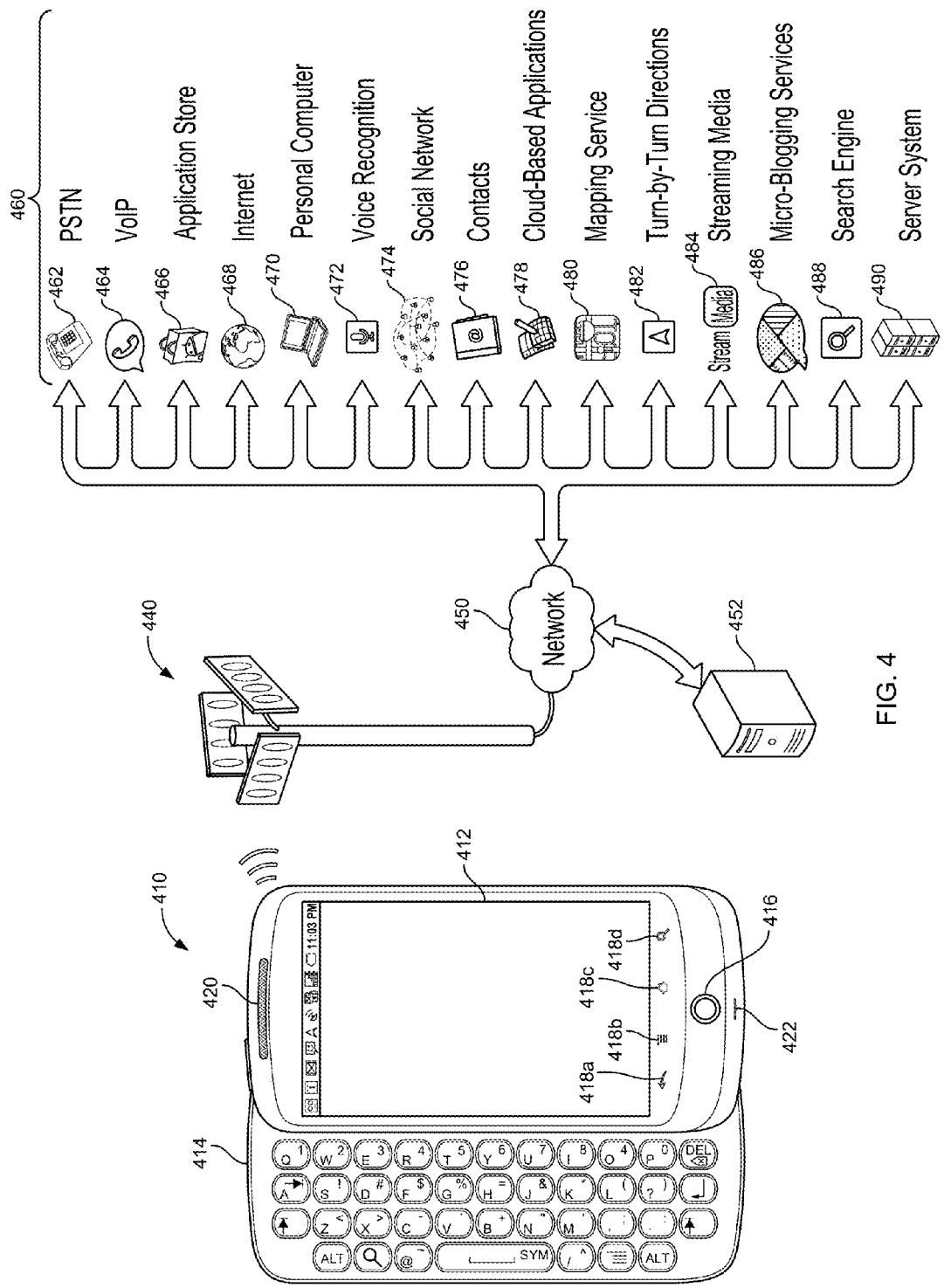
FIG. 4 is a conceptual diagram of a system that may be used to implement the techniques, systems, mechanisms, and methods described in this document.

FIG. 4 is a conceptual diagram of a system that may be used to implement the techniques, systems, mechanisms, and methods described in this document. Mobile computing device 410 can wirelessly communicate with base station 440, which can provide the mobile computing device wireless access to numerous services 460 through a network 450.

In this illustration, the mobile computing device 410 is depicted as a handheld mobile telephone (e.g., a smartphone or an application telephone) that includes a touchscreen display device 412 for presenting content to a user of the mobile computing device 410. The mobile computing device 410 includes various input devices (e.g., keyboard 414 and touchscreen display device 412) for receiving user-input that influences the operation of the mobile computing device 410. In further implementations, the mobile computing device 410 may be a laptop computer, a tablet computer, a personal digital assistant, an embedded system (e.g., a car navigation system), a desktop computer, or a computerized workstation.

The mobile computing device 410 may include various visual, auditory, and tactile user-output mechanisms. An example visual output mechanism is display device 412, which can visually display video, graphics, images, and text that combine to provide a visible user interface. For example, the display device 412 may be a 3.7 inch AMOLED screen. Other visual output mechanisms may include LED status lights (e.g., a light that blinks when a voicemail has been received).

An example tactile output mechanism is a small electric motor that is connected to an unbalanced weight to provide a vibrating alert (e.g., to vibrate in order to alert a user of an incoming telephone call or confirm user contact with the touchscreen 412). Further, the mobile computing device 410 may include one or more speakers 420 that convert an electrical signal into sound, for example, music, an audible alert, or voice of an individual in a telephone call.

An example mechanism for receiving user-input includes keyboard 414, which may be a full qwerty keyboard or a traditional keypad that includes keys for the digits '0-4', '*', and '#'. The keyboard 414 receives input when a user physically contacts or depresses a keyboard key. User manipulation of a trackball 416 or interaction with a trackpad enables the user to supply directional and rate of rotation information to the mobile computing device 410 (e.g., to manipulate a position of a cursor on the display device 412).

The mobile computing device 410 may be able to determine a position of physical contact with the touchscreen display device 412 (e.g., a position of contact by a finger or a stylus). Using the touchscreen 412, various "virtual" input mechanisms may be produced, where a user interacts with a graphical user interface element depicted on the touchscreen 412 by contacting the graphical user interface element. An example of a "virtual" input mechanism is a "software keyboard," where a keyboard is displayed on the touchscreen and a user selects keys by pressing a region of the touchscreen 412 that corresponds to each key.

The mobile computing device 410 may include mechanical or touch sensitive buttons 418a-d. Additionally, the mobile computing device may include buttons for adjusting volume output by the one or more speakers 420, and a button for turning the mobile computing device on or off. A microphone 422 allows the mobile computing device 410 to convert audible sounds into an electrical signal that may be digitally encoded and stored in computer-readable memory, or transmitted to another computing device. The mobile computing device 410 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile computing device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 410 may present a graphical user interface with the touchscreen 412. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 404. User-selection of the button may invoke the pre-defined action.

In some examples, the operating system provides a "desktop" user interface that is displayed upon turning on the mobile computing device 410, activating the mobile computing device 410 from a sleep state, upon "unlocking" the mobile computing device 410, or upon receiving user-selection of the "home" button 418c. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 410 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 412 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. Unlike an application program, which may not be invoked until a user selects a corresponding icon, a widget's application program may start with the mobile telephone. Further, a widget may not take focus of the full display. Instead, a widget may only "own" a small portion of the desktop, displaying content and receiving touchscreen user-input within the portion of the desktop.

The mobile computing device 410 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 410 may include other application modules and hardware. A call handling unit may receive an indication of an incoming telephone call and provide a user capabilities to answer the incoming telephone call. A media player may allow a user to listen to music or play movies that are stored in local memory of the mobile computing device 410. The mobile telephone 410 may include a digital camera sensor, and corresponding image and video capture and editing software. An internet browser may enable the user to view content from a web page by typing in an addresses corresponding to the web page or selecting a link to the web page.

The mobile computing device 410 may include an antenna to wirelessly communicate information with the base station 440. The base station 440 may be one of many base stations in a collection of base stations (e.g., a mobile telephone cellular network) that enables the mobile computing device 410 to maintain communication with a network 450 as the mobile computing device is geographically moved. The computing device 410 may alternatively or additionally communicate with the network 450 through a Wi-Fi router or a wired connection (e.g., Ethernet, USB, or FIREWIRE). The computing device 410 may also wirelessly communicate with other computing devices using BLUETOOTH protocols, or may employ an ad-hoc wireless network.

A service provider that operates the network of base stations may connect the mobile computing device 410 to the network 450 to enable communication between the mobile computing device 410 and other computerized devices that provide services 460. Although the services 460 may be provided over different networks (e.g., the service provider's internal network, the Public Switched Telephone Network, and the Internet), network 450 is illustrated as a single network. The service provider may operate a server system 452 that routes information packets and voice data between the mobile computing device 410 and computing devices associated with the services 460.

The network 450 may connect the mobile computing device 410 to the Public Switched Telephone Network (PSTN) 462 in order to establish voice or fax communication between the mobile computing device 410 and another computing device. For example, the service provider server system 452 may receive an indication from the PSTN 462 of an incoming call for the mobile computing device 410. Conversely, the mobile computing device 410 may send a communication to the service provider server system 452 initiating a telephone call with a telephone number that is associated with a device accessible through the PSTN 462.

The network 450 may connect the mobile computing device 410 with a Voice over Internet Protocol (VoIP) service 464 that routes voice communications over an IP network, as opposed to the PSTN. For example, a user of the mobile computing device 410 may invoke a VoIP application and initiate a call using the program. The service provider server system 452 may forward voice data from the call to a VoIP service, which may route the call over the internet to a corresponding computing device, potentially using the PSTN for a final leg of the connection.

An application store 466 may provide a user of the mobile computing device 410 the ability to browse a list of remotely stored application programs that the user may download over the network 450 and install on the mobile computing device 410. The application store 466 may serve as a repository of applications developed by third-party application developers.

An application program that is installed on the mobile computing device 410 may be able to communicate over the network 450 with server systems that are designated for the application program. For example, a VoIP application program may be downloaded from the Application Store 466, enabling the user to communicate with the VoIP service 464.

The mobile computing device 410 may access content on the internet 468 through network 450. For example, a user of the mobile computing device 410 may invoke a web browser application that requests data from remote computing devices that are accessible at designated universal resource locations. In various examples, some of the services 460 are accessible over the internet.

The mobile computing device may communicate with a personal computer 470. For example, the personal computer 470 may be the home computer for a user of the mobile computing device 410. Thus, the user may be able to stream media from his personal computer 470. The user may also view the file structure of his personal computer 470, and transmit selected documents between the computerized devices.

A voice recognition service 472 may receive voice communication data recorded with the mobile computing device's microphone 422, and translate the voice communication into corresponding textual data. In some examples, the translated text is provided to a search engine as a web query, and responsive search engine search results are transmitted to the mobile computing device 410.

The mobile computing device 410 may communicate with a social network 474. The social network may include numerous members, some of which have agreed to be related as acquaintances. Application programs on the mobile computing device 410 may access the social network 474 to retrieve information based on the acquaintances of the user of the mobile computing device. For example, an "address book" application program may retrieve telephone numbers for the user's acquaintances. In various examples, content may be delivered to the mobile computing device 410 based on social network distances from the user to other members. For example, advertisement and news article content may be selected for the user based on a level of interaction with such content by members that are "close" to the user (e.g., members that are "friends" or "friends of friends").

The mobile computing device 410 may access a personal set of contacts 476 through network 450. Each contact may identify an individual and include information about that individual (e.g., a phone number, an email address, and a birthday). Because the set of contacts is hosted remotely to the mobile computing device 410, the user may access and maintain the contacts 476 across several devices as a common set of contacts.

The mobile computing device 410 may access cloud-based application programs 478. Cloud-computing provides application programs (e.g., a word processor or an email program) that are hosted remotely from the mobile computing device 410, and may be accessed by the device 410 using a web browser or a dedicated program. Example cloud-based application programs include GOOGLE DOCS word processor and spreadsheet service, GOOGLE GMAIL webmail service, and PICASA picture manager.

Mapping service 480 can provide the mobile computing device 410 with street maps, route planning information, and satellite images. An example mapping service is GOOGLE MAPS. The mapping service 480 may also receive queries and return location-specific results. For example, the mobile computing device 410 may send an estimated location of the mobile computing device and a user-entered query for "pizza places" to the mapping service 480. The mapping service 480 may return a street map with "markers" superimposed on the map that identify geographical locations of nearby "pizza places."

Turn-by-turn service 482 may provide the mobile computing device 410 with turn-by-turn directions to a user-supplied destination. For example, the turn-by-turn service 482 may stream to device 410 a street-level view of an estimated location of the device, along with data for providing audio commands and superimposing arrows that direct a user of the device 410 to the destination.

Various forms of streaming media 484 may be requested by the mobile computing device 410. For example, computing device 410 may request a stream for a pre-recorded video file, a live television program, or a live radio program. Example services that provide streaming media include YOUTUBE and PANDORA.

A micro-blogging service 486 may receive from the mobile computing device 410 a user-input post that does not identify recipients of the post. The micro-blogging service 486 may disseminate the post to other members of the micro-blogging service 486 that agreed to subscribe to the user.

A search engine 488 may receive user-entered textual or verbal queries from the mobile computing device 410, determine a set of internet-accessible documents that are responsive to the query, and provide to the device 410 information to display a list of search results for the responsive documents. In examples where a verbal query is received, the voice recognition service 472 may translate the received audio into a textual query that is sent to the search engine.

These and other services may be implemented in a server system 490. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network, but may not include the second device receiving the data. Conversely, "receiving" from a first device may include receiving the data from a network, but may not include the first device transmitting the data.

Figure 5:
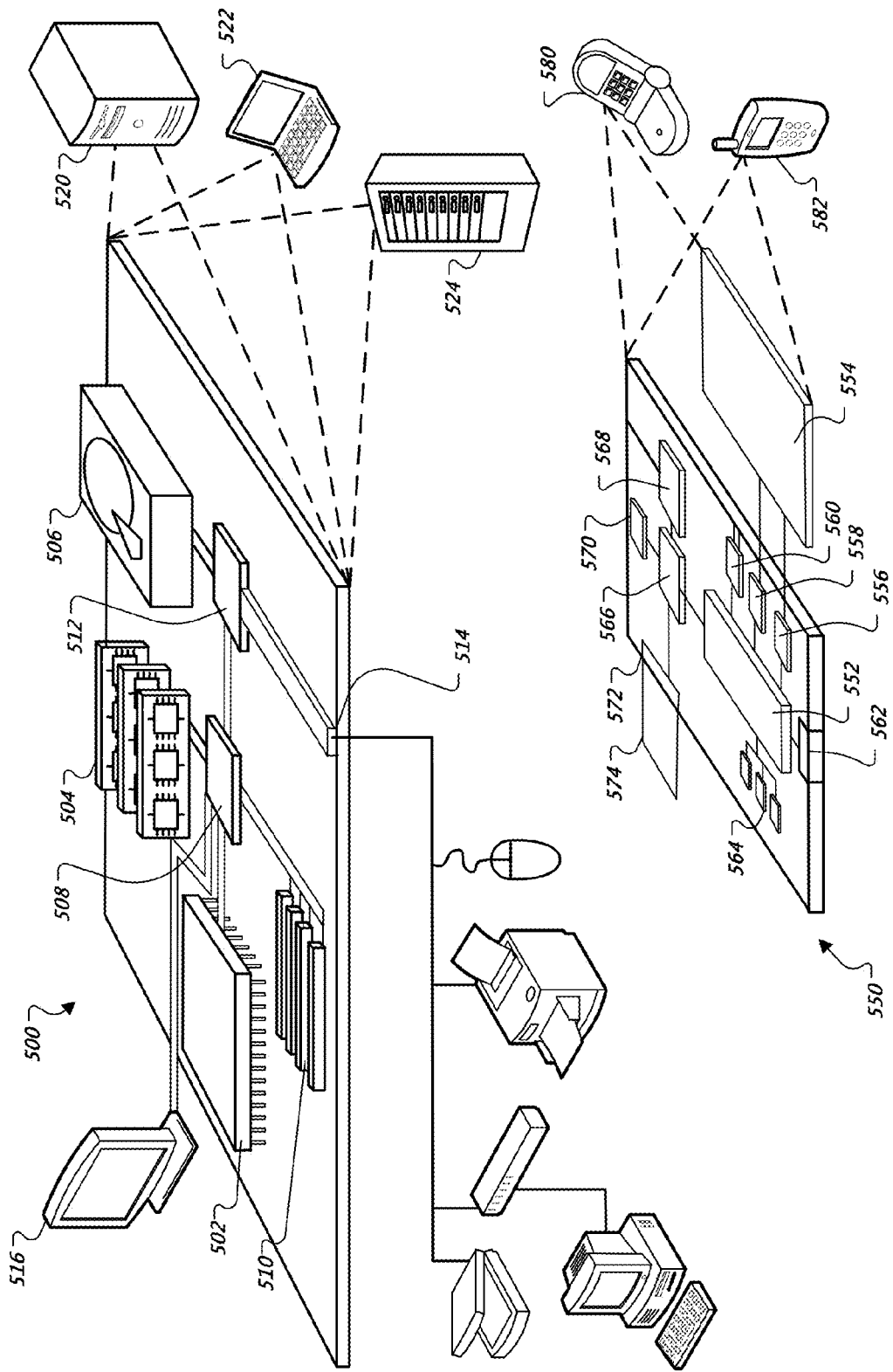
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for automatically monitoring for voice input may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising: detecting a change in a context associated with a computing device; in response to detecting the change in the context associated with the computing device, classifying a changed context as a context that likely indicates that ambient sounds will include one or more trigger terms that correspond to a request from a user for the computing device to perform an operation; in response to classifying the changed context as a context that likely indicates that ambient sounds will include the one or more trigger terms that correspond to the request from the user for the computing device to perform an operation, switching the computing device to a mode of operation in which the computing device monitors the ambient sounds for the one or more trigger terms that correspond to the request from the user for the computing device to perform an operation; receiving the ambient sounds; receiving data indicating that the ambient sounds include the one or more trigger terms that correspond to the request from the user for the computing device to perform an operation; and in response to receiving data indicating that the ambient sounds include the one or more trigger terms that correspond to the request from the user for the computing device to perform the operation, providing an output that is responsive to the request.

2. The method of claim 1, wherein classifying a changed context as a context that likely indicates that ambient sounds will include the one or more trigger terms that correspond to the request from a user for the computing device to perform an operation is based at least on data indicating a correctness of a previous classification of a context as a context that likely indicates that ambient sounds will include the one or more trigger terms that correspond to the request from the user for the computing device to perform an operation.

3. The method of claim 1, wherein the changed context associated with the computing device indicates a physical location at which the computing device is located.

4. The method of claim 1, wherein the changed context associated with the computing device indicates a time of day.

5. The method of claim 1, wherein detecting a change in a context associated with a computing device comprises detecting a change in an environment using sensors of the computing device.

6. The method of claim 1, wherein switching the computing device to a mode of operation in which the computing device monitors the ambient sounds for the one or more trigger terms that correspond to the request from the user for the computing device to perform an operation comprises: switching the computing device from a prior mode of operation in which the computing device does not monitor the ambient sounds for the one or more trigger terms that correspond to the request from the user for the computing device to perform an operation.

7. The method of claim 6, comprising: detecting a second change in the context associated with the computing device; in response to detecting the second change in the context associated with the computing device, classifying a second changed context as a context that does not likely indicate that ambient sounds will include the one or more trigger terms that correspond to the request from the user for the computing device to perform an operation; and in response to classifying a second changed context as a context that does not likely indicate that ambient sounds will include the one or more trigger terms that correspond to the request from the user for the computing device to perform an operation, switching the computing device to back the prior mode of operation in which the computing device does not monitor the ambient sounds for the one or more trigger terms that correspond to the request from the user for the computing device to perform an operation.

8. A system comprising: one or more computers and one or more storage devices storing instructions that are operable, when executed by the one or more computers, to cause the one or more computers to perform operations comprising: detecting a change in a context associated with a computing device; in response to detecting the change in the context associated with the computing device, classifying a changed context as a context that likely indicates that ambient sounds will include one or more trigger terms that correspond to a request from a user for the computing device to perform an operation; in response to classifying the changed context as a context that likely indicates that ambient sounds will include the one or more trigger terms that correspond to the request from the user for the computing device to perform an operation, switching the computing device to a mode of operation in which the computing device monitors the ambient sounds for the one or more trigger terms that correspond to the request from the user for the computing device to perform an operation; receiving the ambient sounds; receiving data indicating that the ambient sounds include the one or more trigger terms that correspond to the request from the user for the computing device to perform an operation; and in response to receiving data indicating that the ambient sounds include the one or more trigger terms that correspond to the request from the user for the computing device to perform the operation, providing an output that is responsive to the request.

9. The system of claim 8, wherein classifying a changed context as a context that likely indicates that ambient sounds will include the one or more trigger terms that correspond to the request from a user for the computing device to perform an operation is based at least on data indicating a correctness of a previous classification of a context as a context that likely indicates that ambient sounds will include the one or more trigger terms that correspond to the request from the user for the computing device to perform an operation.

10. The system of claim 8, wherein the changed context associated with the computing device indicates a physical location at which the computing device is located.

11. The system of claim 8, wherein the changed context associated with the computing device indicates a time of day.

12. The system of claim 8, wherein detecting a change in a context associated with a computing device comprises detecting a change in an environment using sensors of the computing device.

13. The system of claim 8, wherein switching the computing device to a mode of operation in which the computing device monitors the ambient sounds for the one or more trigger terms that correspond to the request from the user for the computing device to perform an operation comprises: switching the computing device from a prior mode of operation in which the computing device does not monitor the ambient sounds for the one or more trigger terms that correspond to the request from the user for the computing device to perform an operation.

14. The system of claim 13, comprising: detecting a second change in the context associated with the computing device; in response to detecting the second change in the context associated with the computing device, classifying a second changed context as a context that does not likely indicate that ambient sounds will include the one or more trigger terms that correspond to the request from the user for the computing device to perform an operation; and in response to classifying a second changed context as a context that does not likely indicate that ambient sounds will include the one or more trigger terms that correspond to the request from the user for the computing device to perform an operation, switching the computing device to back the prior mode of operation in which the computing device does not monitor the ambient sounds for the one or more trigger terms that correspond to the request from the user for the computing device to perform an operation.

15. A non-transitory computer-readable medium storing software comprising instructions executable by one or more computers which, upon such execution, cause the one or more computers to perform operations comprising: detecting a change in a context associated with a computing device; in response to detecting the change in the context associated with the computing device, classifying a changed context as a context that likely indicates that ambient sounds will include one or more trigger terms that correspond to a request from a user for the computing device to perform an operation; in response to classifying the changed context as a context that likely indicates that ambient sounds will include the one or more trigger terms that correspond to the request from the user for the computing device to perform an operation, switching the computing device to a mode of operation in which the computing device monitors the ambient sounds for the one or more trigger terms that correspond to the request from the user for the computing device to perform an operation; receiving the ambient sounds; receiving data indicating that the ambient sounds include the one or more trigger terms that correspond to the request from the user for the computing device to perform an operation; and in response to receiving data indicating that the ambient sounds include the one or more trigger terms that correspond to the request from the user for the computing device to perform the operation, providing an output that is responsive to the request.

16. The non-transitory computer-readable medium of claim 15, wherein classifying a changed context as a context that likely indicates that ambient sounds will include the one or more trigger terms that correspond to the request from a user for the computing device to perform an operation is based at least on data indicating a correctness of a previous classification of a context as a context that likely indicates that ambient sounds will include the one or more trigger terms that correspond to the request from the user for the computing device to perform an operation.

17. The non-transitory computer-readable medium of claim 15, wherein the changed context associated with the computing device indicates a physical location at which the computing device is located.

18. The non-transitory computer-readable medium of claim 15, wherein the changed context associated with the computing device indicates a time of day.

19. The non-transitory computer-readable medium of claim 15, wherein detecting a change in a context associated with a computing device comprises detecting a change in an environment using sensors of the computing device.

20. The non-transitory computer-readable medium of claim 15, wherein switching the computing device to a mode of operation in which the computing device monitors the ambient sounds for the one or more trigger terms that correspond to the request from the user for the computing device to perform an operation comprises: switching the computing device from a prior mode of operation in which the computing device does not monitor the ambient sounds for the one or more trigger terms that correspond to the request from the user for the computing device to perform an operation.

* * * * *